(12) United States Patent
Rivers

(10) Patent No.: US 12,176,007 B1
(45) Date of Patent: Dec. 24, 2024

(54) AUTOMATED VIDEO GENERATION

(71) Applicant: Dorine Rivers, Carefree, AZ (US)

(72) Inventor: Dorine Rivers, Carefree, AZ (US)

(*) Notice: Subject to any disclaimer, the term of this patent is extended or adjusted under 35 U.S.C. 154(b) by 0 days.

(21) Appl. No.: 18/636,482

(22) Filed: Apr. 16, 2024

Related U.S. Application Data

(63) Continuation-in-part of application No. 18/400,879, filed on Dec. 29, 2023.

(51) Int. Cl.
    *G11B 27/031* (2006.01)
    *G06F 21/10* (2013.01)
    *G06F 40/20* (2020.01)

(52) U.S. Cl.
    CPC ............ *G11B 27/031* (2013.01); *G06F 21/10* (2013.01); *G06F 40/20* (2020.01)

(58) Field of Classification Search
    CPC ........ G11B 27/031; G06F 40/20; G06F 21/10
    See application file for complete search history.

(56) References Cited

U.S. PATENT DOCUMENTS

| | | | |
|---|---|---|---|
| 11,556,754 B1* | 1/2023 | Ramanarayanan | G06F 16/22 |
| 2017/0083599 A1* | 3/2017 | Bostick | G06F 16/954 |
| 2019/0146636 A1* | 5/2019 | Kremer-Davidson | G06N 7/01 |
| | | | 706/11 |
| 2021/0103865 A1* | 4/2021 | Anisingaraju | G06F 16/367 |
| 2023/0237028 A1* | 7/2023 | Sweeney | G06N 5/025 |
| | | | 706/11 |

* cited by examiner

*Primary Examiner* — Mishawn N. Hunter
(74) *Attorney, Agent, or Firm* — Ice Miller LLP

(57) ABSTRACT

Disclosed systems and methods convert user-supplied textual content into animated videos. Textual input is received and processed to identify narrative elements such as characters, settings, and events. These elements are then transformed into visual scene components. Still images generated based on these components are subsequently animated in line with the narrative context. The system can automatically implement storytelling techniques adapted to incorporate neuroscience principles. The system also synthesizes speech for dialogues or narrations using voice synthesis technology that considers emotional markers, tone, and pace. Generated media and metadata are stored in a data storage system that maintains data integrity and enables efficient retrieval. Users can interact with an export interface to choose video resolution, format, and sharing options. A feedback system employing machine learning algorithms collects and analyzes user feedback for real-time adjustments to the generated animated video.

20 Claims, 9 Drawing Sheets

AUTOMATED VIDEO GENERATION

CROSS-REFERENCE TO RELATED APPLICATION

This application is a continuation of U.S. patent application Ser. No. 18/400,879, filed Dec. 29, 2023, which is hereby incorporated by reference in its entirety.

BACKGROUND

Conventionally, the process of adapting textual content into visual media has relied heavily on human intervention, often involving time-consuming and labor-intensive efforts. This manual approach typically involves scriptwriting, storyboarding, animation, manual editing, voice over, sound effects, video production, etc., which demand considerable expertise and resources.

Challenges arise primarily due to the complexity of the task. Converting text into visually engaging content involves interpreting the narrative, identifying key elements, and translating them into images and animations. Achieving accuracy in conveying the author's intended message while maintaining viewer engagement is a demanding endeavor.

Furthermore, the traditional adaptation process faces limitations in scalability and efficiency. Adapting large volumes of text, such as novels or textbooks, into visual formats can be a protracted and resource-intensive task. This inefficiency becomes particularly evident when considering the ever-expanding volume of textual content generated in various fields.

Additionally, conventional methods often struggle with localization, as adapting content for diverse audiences, languages, or cultural contexts requires substantial time and resources. The need to manually adjust visuals and animations to suit different target markets hampers the efficiency of the adaptation process.

Overall, the challenges associated with conventional methods for converting text into visual media encompass labor intensiveness, scalability issues, adaptation complexity, and limitations in addressing diverse audiences. These limitations highlight the need for innovative approaches to streamline and enhance this transformative process.

BRIEF SUMMARY OF THE INVENTION

Embodiments described herein enhance the efficiency and innovation in automated video generation from text-based content. In some embodiments, a video generation system includes a modular text processing unit and an associated computing device, such as a server. The server identifies specific textual segments and themes from the text-based content of an author or content creator. The identification process is informed by at least one of: first information comprising historical data related to previously generated videos, second information comprising predictive data about probable animation styles or themes based on the nature of the text, and third information relating to the settings and preferences of the content creator or end users. Upon identification, the server processes the content through the modular text processing unit, converting it into visual movies, animations, or other videos, in line with the text's intent.

In a non-limiting example, a computing device can pinpoint pivotal elements and thematic nuances within the text-based content. Using this refined data, the computing device then interfaces with a visual generation module to create visuals that resonate with these themes. The algorithms within the server can further discern emotional tones, ensuring the generated visuals echo the mood intended by the original content.

In some embodiments, the computing device, upon analyzing the text, deduces optimal voice settings for the narration, deciding factors such as tone, pace, and gender. It determines the nature of the content, whether it's informative, narrative, or argumentative, and adjusts voice settings accordingly. In some embodiments, the associated determinations may be based on settings and preferences of the content creator or end users. Concurrently, the device also interfaces with the animation module, determining the ideal animation style and transitions based on the text's flow.

In certain embodiments, the computing device manages, or causes to be managed, the final integration of the visual content, animations, and the narration. This integrated output is then made ready for publishing. Furthermore, embodiments also involve the creation of a data set detailing the specifics of the video generation. For instance, the computing device could create or update a dataset based on user feedback or preferences, continually refining the video generation process based on historical data of previously generated content.

In some embodiments, the AI-generative system can convert textual content into dynamic visual media, offering a wide array of customization options. In some embodiments, the video generation system includes a comprehensive approach to transitioning text-based content into engaging visual formats, such as videos and animations. In one non-limiting example, the AI system undertakes a multifaceted analysis of the input text, breaking it down into manageable sections and identifying critical elements within each section. For example, these elements can span a spectrum, encompassing characters, settings, plot developments, and thematic elements. An integrated approach ensures that the generated visual representation effectively captures the nuances of the original text.

Integration of Neuroscience Principles in Content Generation:

In some embodiments, the AI-generative system is configured to incorporate neuroscience principles into the AI-generating video process, by default or at the selection of the user. This integration is grounded in the understanding that effective storytelling significantly enhances neural activity, leading to better retention and comprehension of information. The AI-generative system leverages analyzing the narrative structure of the uploaded text and optimizing it for improved engagement and memorability. This approach achieves non-conventional advantages in automating content in educational and training contexts, where retention of information is paramount.

In some embodiments, an Enhanced Storytelling component is configured to transform standard educational content into engaging and memorable narratives. This component can be configured to employ AI algorithms specifically trained and refined in utilizing modeling data to recognize and apply effective storytelling techniques. These algorithms analyze text for elements such as emotional arcs, character development, and plot points, enhancing the narrative to make it more relatable and impactful.

In some embodiments, the AI-generative system provides users with the option to activate the Enhanced Storytelling feature. This feature, accessible via the user interface, allows users to opt-in for an additional layer of content enhancement. When activated, the system applies advanced narrative techniques to the uploaded text, enabling AI generation of content that is engaging and memorable in addition to being informative.

In some embodiments, the AI-generative system is configured to infuse metaphorical and other narrative elements into the educational material. By integrating these elements, the system transforms traditional educational content into a more story-like format, making it generating content in an automated manner that is engaging and easier to recall. This functionality aligns with the cognitive principle that stories and metaphors are more readily absorbed and remembered by the human brain.

In some embodiments, the system can include a feedback loop mechanism that assesses the effectiveness of the storytelling elements based on user engagement and retention metrics. This feedback loop allows for continuous improvement of the storytelling algorithms, ensuring that the narratives generated are optimally tailored for educational impact and audience engagement.

The system's approach to storytelling in video generation is informed by research in neuroscience and cognitive psychology, which differentiates the system from conventional video generation platforms to provide content, including educational content, that is informative, engaging, and memorable.

Advantages of the AI-Generative Video Generation System

The system can also be configured for customization and scalability. In some embodiments, users are enabled to tailor the visual style, animations, and media format according to their preferences. This flexibility allows for a diverse range of applications, whether it involves adapting a novel into an animated film or creating educational videos based on textbooks.

The disclosed video generation system provides an iterative refinement process. In one non-limiting example, the system employs a series of algorithms and parameters, which users can fine-tune to enhance the quality and accuracy of the generated visuals. These refinements encompass constant feedback loops and parameter adjustments, ensuring that the resulting visuals align with the text's intended meaning.

In some embodiments, the move generation system includes integration of audio elements into the visual content. In some embodiments, the audio components can be synchronized with the visuals to offer a cohesive multimedia experience. This integration proves particularly valuable in adapting audiobooks, ensuring that narration aligns with the visuals.

Scalability is also addressed by the video generation system. Users can apply the AI-driven process to various texts and projects, offering versatility and efficiency. Whether it involves converting a single book or producing a series of educational videos, the system's adaptability makes it a powerful tool for content creators.

In some embodiments, it involves natural language processing (NLP) for in-depth text analysis, computer vision for generating images, and audio synchronization algorithms. These technologies work cohesively to guarantee the precise and efficient transformation of text into captivating visual media.

Disclosed embodiments can also be extended to diverse fields beyond entertainment and education. In some embodiments, the video generation system can be used in marketing, to transform written content into promotional videos. Additionally, the video generation system can facilitate content localization, adapting texts for various cultures and languages.

Disclosed embodiments provide an unconventional AI-powered system that facilitates converting textual content into dynamic visual media. The adaptability, customization capabilities, iterative refinement, and comprehensive approach to video generation enable content creators across a broad spectrum of applications.

BRIEF DESCRIPTION OF THE DRAWINGS/FIGURES

DETAILED DESCRIPTION OF THE INVENTION

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 1:
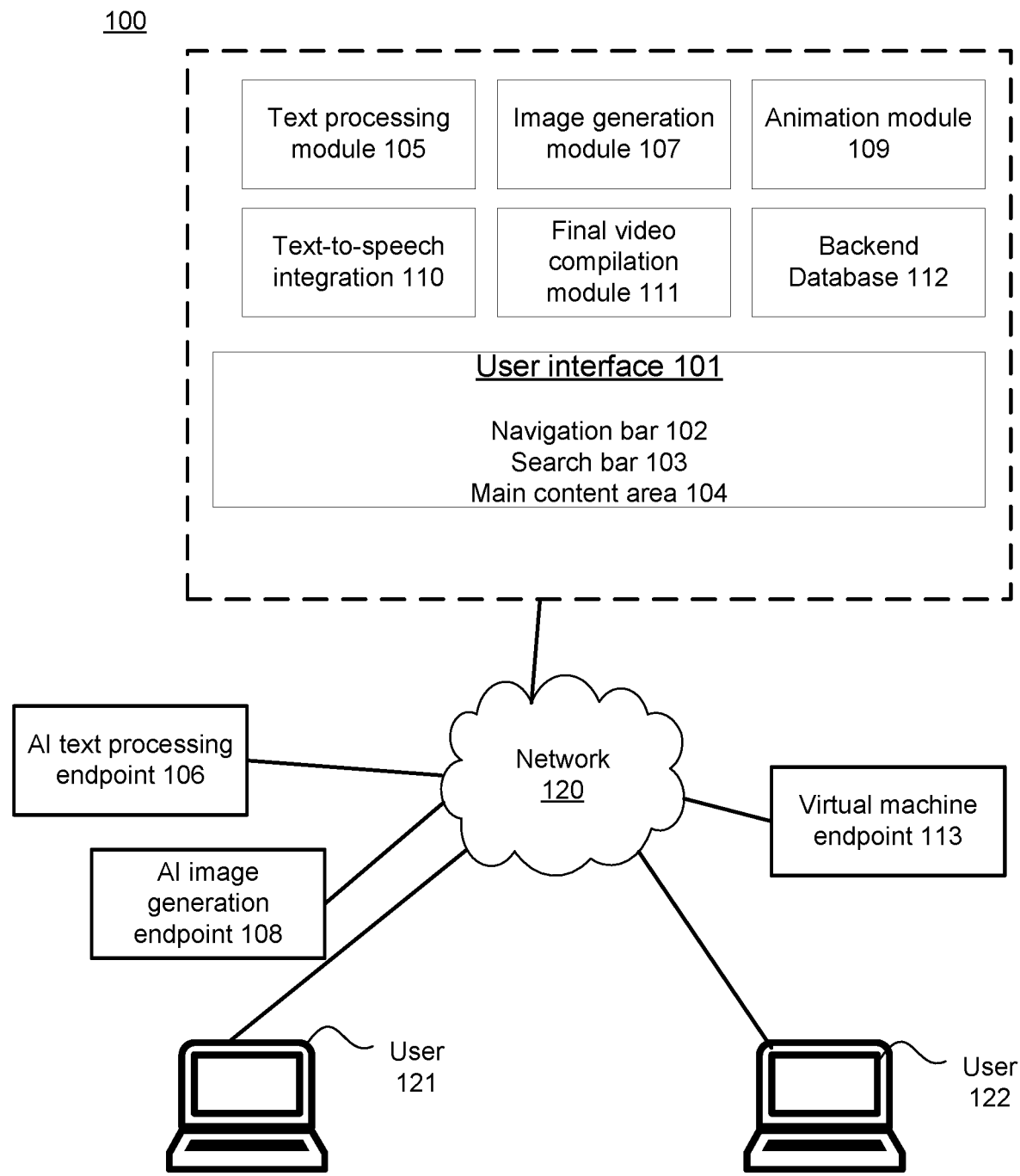
FIG. 1 is an example operating environment of a system for transforming written text into animated scenes and videos, according to some embodiments.

In an embodiment, FIG. 1 illustrates a block diagram of an environment 100 wherein an AI-generating video system may exist. The operating environment encompasses several interconnected components configured to transform written text into animated scenes and/or videos. These elements may be interconnected, for example, via a network 120 to facilitate transforming text provided by one or more users (e.g., users 121 and 122) into one or more animated scenes and/or videos.

The user interface 101 serves as the main point of interaction for users. It provides options to upload written text, view generated scenes, and manage video projects. The interface includes features such as a navigation bar 102 that facilitates access to various tool features, templates, and resources. Additionally, a search bar 103 enables users to quickly locate specific tools, tutorials, or other information within the platform. In some embodiments, the user interface 101 permits the user to incorporate advanced customization options for scene creation. Users can select from various animation templates and styles, such as comic book, cinematic, 3D model, digital art, fantasy art, isometric, and pixel art, etc., to define the visual aesthetics of their project.

User interface 101 can be configured to embody a high degree of flexibility and accessibility, catering to a broad range of user needs and preferences. In some non-limiting examples, user interface 101 can be designed to accommodate various forms of input to enable users to either type in their content directly or upload text files. This adaptability provides accessibility to users with different preferences and technical capabilities, ensuring a wide applicability across various user demographics. User interface 101 can also be configured to offer diverse customization options, allowing users to tailor their video projects to specific requirements. This includes, not limited to, selecting from a range of animation styles, setting scene parameters, and adjusting narration tones. The user interface's intuitive design facilitates easy navigation and manipulation of these features, significantly simplifying video creation for users of varying skill levels. By integrating these flexible and user-friendly features, the system not only enhances its usability but also expands its reach, appealing to a diverse user base ranging from educational institutions to corporate entities.

The main content area 104 presents the user with a variety of templates, sample videos, and success stories. These resources aid in understanding the capabilities of the platform and offer inspiration for video creation. In some embodiments, the main content area 104 can incorporate a template selection panel, offering users a library of predefined animation templates, scene settings, and character designs. For example, thumbnails can provide visual previews, and hover tooltips can offer descriptions, aiding users in making informed choices.

Text processing module 105 can be operably connected to the user interface. This module uses a general AI text processing system, for instance, OpenAI's ChatGPT, or other AI text processing systems, represented by the AI text processing endpoint 106, to transform uploaded written text into detailed scenes suitable for animation. The scenes are crafted based on the content and context of the uploaded text, ensuring relevancy and coherence.

Once the scenes are determined, an image generation module 107 interfaces with a general AI image creation system, like Stability.AI, depicted by the AI image generation endpoint 108. This module translates each scene description into a static image representation. These generated images serve as a starting point for animations, ensuring consistency with the text's intent.

Subsequent to image generation, an animation module 109 further interfaces with a general AI animation system to animate the created static images. It utilizes parameters set by users or predefined by the platform to ensure the animation aligns with the desired style and feel.

For users who wish to add audio to their videos, a text-to-speech integration 110 can be provided. This tool can, for example, convert written narration or dialogue into realistic voiceovers that can be layered onto the generated videos. In some embodiments, text-to-speech integration 110 can permit users to choose from a variety of voice types, accents, and modulation settings, etc., ensuring the chosen voice matches the desired emotion and narrative tone. The module can include integration with third-party voice synthesis technologies (e.g., ELEVENLABS, etc.).

The final video compilation module 111 can amalgamate the animated scenes, voiceovers, and any additional media into a cohesive video. Users can then preview, edit, and finalize their creation before exporting it to their desired format or platform. In some embodiments, final video compilation module 111 can perform or facilitate the addition of user-specific branding elements like logos or watermarks. Likewise, final video compilation module 111 can enable the insertion of external media assets, such as video clips or images, for further customization.

The backend database 112 can store user data, project files, generated scenes, images, videos, and other relevant data. Hosted on a generic cloud platform, like AWS, indicated by the virtual machine endpoint 113, the database provides secure and efficient storage and retrieval of information.

Operating environment 100 of FIG. 1 provides a comprehensive ecosystem for users to transform written content into animated videos with the assistance of AI tools. In an example of environment 100, system 101 operates as an integrated network of components and unconventional technologies to generate videos from textual content efficiently. This process begins with the user interface 102, where one or more users can input textual content and configure parameters. The main content area 104 can be provided as a dynamic workspace, receiving the processed information and orchestrating the assembly of the final video. This area can be provided as a central hub for the system's operation.

Operably connected with main content area 104, text processing module 105 initiates the process by analyzing the textual input. In some examples, text processing area 105 can employ NLP techniques to extract elements, such as characters, settings, and themes, establishing the foundation for the system's understanding.

In an embodiment, the AI text processing module 105, can utilize a variant of Generative Pre-trained Transformer (GPT) for handling various forms of textual input, from complete chapters to summarized narratives. This module is particularly configured to discern user preferences regarding the fidelity of narration to the original text. In instances like compliance training, where precise wording is paramount, the module maintains the integrity of the original text, whereas, in more flexible scenarios, it can summarize the content for brevity and relevance. Thereby, system 101 embodies an unconventional approach in text processing, enabling the system to cater to diverse application needs, from educational content to corporate training materials. The module's capability to adapt its processing approach based on content type and user preference can be automated to provide purely AI-driven content adaptation based on the textual input, distinct from conventional text-to-video systems.

Interconnected with the text processing module 105, AI text processing endpoint 106 can provide, for example, a Generative Pre-Trained Transformer (GPT) to comprehend the text contextually, and process the text to discern nuances, tone, and context, enhancing the overall quality of the video's narrative interpretation. Additionally, AI text processing endpoint 106 can be configured to perform content summarization and transformation. It can analyze extensive textual content, such as entire book chapters, and generate concise, impactful summaries suitable for scene narrations.

In some embodiments, text processing module 105 performs functions of breaking down the input text, such as a book, into structured scenes. Text processing module 105 can use NLP techniques to analyze the textual content comprehensively. In some embodiments, text processing module 105 can divide text into scenes based on structural indicators in the text, such as chapters, paragraph marks, etc. In other embodiments, text processing module 105 can divide text into scenes based on pre-determined or customizable aspects, such as text-length, scene duration, or other pre-determined or customizable aspects. In this process, the module identifies key elements within the text, including characters, settings, plot points, dialogues, and other relevant details.

Thereby, in some embodiments, rather than treating the entire text as a single entity, text processing module 105 dissects it into discrete scenes or segments. These scenes are defined by their content and context within the narrative. For example, in a novel, each scene could correspond to a specific chapter, a significant event, or a change in the story's location or perspective. In some embodiments, the system 101 can perform one or more automated processes for scene division and image prompt generation. Once the text is processed, text processing module 105 segments the narration into discrete scenes. Each scene's distinct narrative segment then undergoes analysis by the AI image generation endpoint 108, which generates contextually relevant image prompts. This process involves one or more AI algorithms that interpret narrative elements like mood, setting, and character actions to create visually coherent prompts. System 101 can be configured based on user or cohort customization or other considerations described herein to create accurate and diverse prompts for a wide array of narrative styles. Thus, system 101 is configured to automatically tailor each scene's visual representation to its narrative content. Embodiments described herein can thereby enhance the storytelling aspect of the videos while contributing to a more engaging and immersive viewer experience. System 101 can accurately transform textual nuances into visual cues.

The output of the text processing module can be a structured representation of the input text, where the text can be divided into individual scenes, each with its unique attributes and content. This structured scene breakdown serves as the foundation for subsequent stages in the video generation process, allowing for a more granular and organized transformation of the text into a visual and auditory medium.

Image generation module 107 complements the text processing module by translating textual descriptions into visual representations by connecting operably to AI image generation endpoint 108. AI image generation endpoint 108 can include a generative AI tool to generate photo-realistic images, or other types of images, by inputting text, employing computer vision algorithms to create images that align with the narrative. In some embodiments, AI image generation endpoint 108 can be exemplified by Stability.AI, or similar AI image generation applications. These images can visually convey the content, providing a foundation for and enriching the video's overall presentation. In some embodiments, AI image generation endpoint 108 can generate unique images based on user-defined or AI-suggested text prompts, distinguishing each scene with original visual content and providing an alternative from reliance on stock imagery.

The animation module 109 injects motion and dynamism into the visual elements, ensuring that the visual components of the content come to life. It collaborates closely with the preceding components to create a cohesive fusion of textual and visual elements.

To provide a comprehensive user experience, the text-to-speech integration module 110 synchronizes audio elements with the visuals. This integration ensures that auditory components align with the visuals, enhancing accessibility and engagement for a broader audience.

System 101 within environment 100 operates as an integrated system of components and unconventional technologies to transform textual content into videos. The user interface facilitates user input and customization, while the main content area acts as the central workspace for the video generation process. The text processing module, coupled with AI text processing endpoint GPT, comprehensively interprets the text. The image generation module, supported for example by AI image generation endpoint Stability.AI, creates visual representations, and the animation module can be configured to provide motion to the depiction. System 101 can be configured to be mobile-compatible. In some embodiments, system 101 can provide a streamlined or scaled-back user interface for mobile devices. A mobile version can maintain essential functionalities, enabling users a portable interface to upload assets and manage projects.

Further, text-to-speech integration module 110 synchronizes audio with visuals. This collaborative system utilizes technological solutions to adapt textual content into engaging videos for various applications and audiences. System 101 is capable of providing broad reach and user convenience, and can include export and sharing functionalities that enable users to output videos in multiple formats, upload them directly to platforms such as YOUTUBE, provide links to cloud storage solutions, etc.

In a further embodiment, system 101 can perform synchronous and asynchronous processes, optimizing performance for complex video creation tasks. In some embodiments, management of synchronous and asynchronous tasks can be managed by a dedicated Management Module (not shown). In other embodiments, the management can be performed granularly within the holistic system architecture.

In some non-limiting examples, immediate/real-time tasks such as generating still images can be executed synchronously, more time-intensive operations like scene division and extended narration processing can be managed asynchronously. This automated process management enables system 101 to handle extensive processing without continuous user interaction, enhancing user convenience.

An asynchronous model is particularly effective for processing lengthy or complex narratives, where each segment may require substantial computational resources. By delegating such tasks to a background process, the system ensures continuous and efficient performance, minimizing wait times and enhancing overall user experience. This approach emphasizes a distinct approach to managing computational loads in AI-driven content generation.

In another aspect of the invention, the system can be configured to integrate technical solutions to automate the video creation process efficiently. Addressing the challenges associated with automating this process, the system employs AI algorithms for generating accurate and context-sensitive prompts for both narration and imagery. System 101 is provided to address complex technical issues encountered in such automation, such as generating coherent prompts from diverse text inputs and managing time-intensive scene division processes. The system's architecture, which combines synchronous and asynchronous processing, allows for efficient handling of complex tasks, ensuring that the system remains responsive and user-friendly.

Furthermore, the system's capability to adapt its processing techniques based on the content type and user preferences provides a distinct advantage in personalized content creation. This approach streamlines video production processes and ensures that the end product is aligned with the user's vision and objectives. The integration of these technical solutions into a cohesive system provides a scalable, efficient, and user-centric solution for automated video production.

Figure 2:
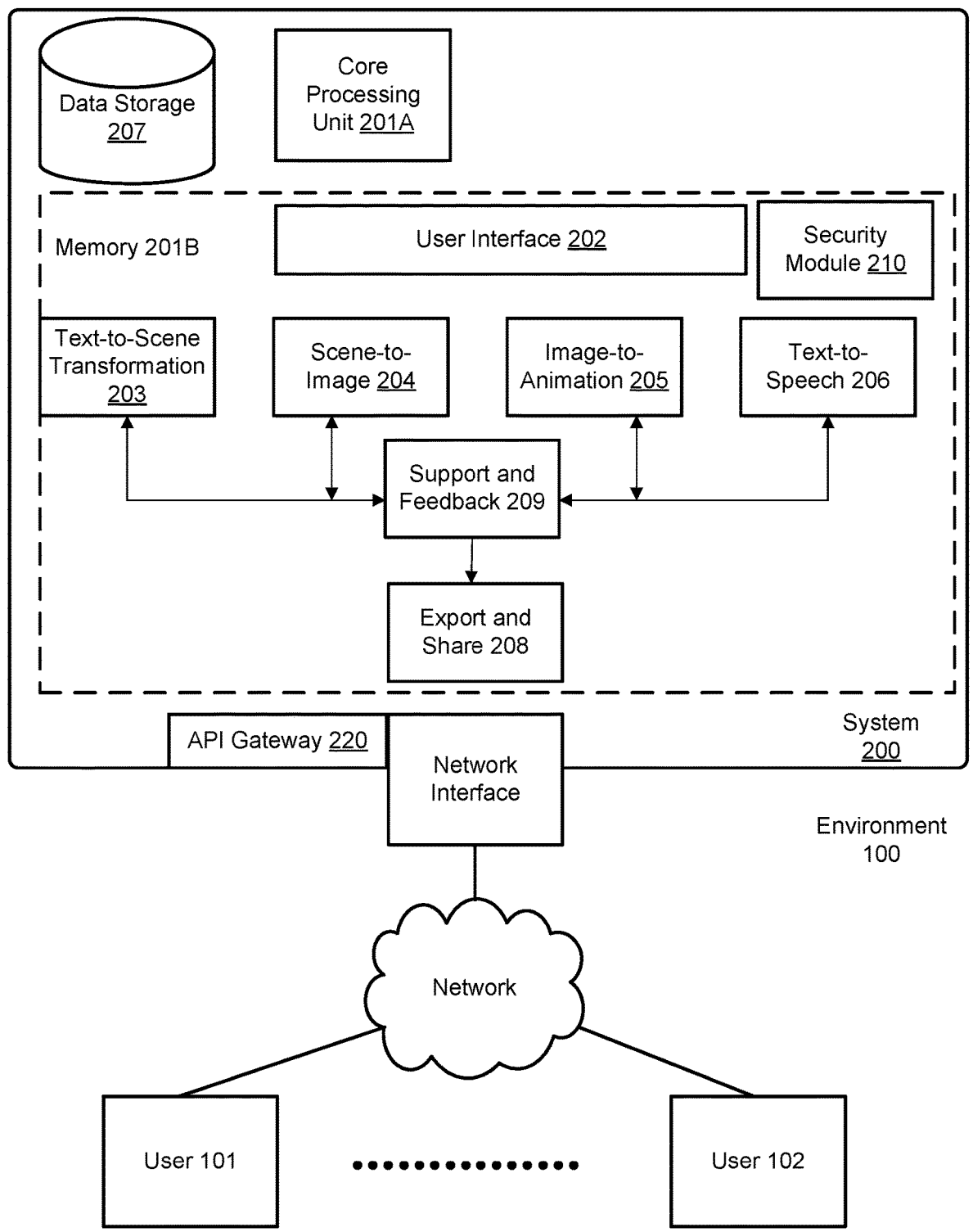
FIG. 2 is an illustration of a system for transforming written text into animated scenes and videos, according to some embodiments.

FIG. 2 illustrates an AI-driven system 200 for converting textual content into animated videos. System 200 includes Processor 201A, and Memory 201B. Processor 201A can be configured to execute processes and modules stored in Memory 201B. These elements can include User Interface Module 202, Text-to-Scene Transformation Module 203, Scene-to-Image Module 204, Image-to-Animation Module 205, Text-to-Speech Converter 206, Data Storage Module 207, Export and Share Module 208, Support and Feedback Module 209, and the Security Module 210.

As shown in FIG. 2, the system 200 facilitates AI-generated video creation. The Core Processing Unit 201 serves as the central controller, orchestrating and coordinating the various modules of the system.

Users may interact directly with User Interface Module 202. For example, a user can upload text, choose from several templates, adjust settings according to their preferences, etc. User Interface Module 202 can be configured to accept diverse textual inputs, from book chapters to short scripts, and to integrate functionalities including integrated text editing, and direct linking to external content sources. In some embodiments, User Interface Module 202 can be operably connected to a Content Validation component, which can be a component of Security Module 210, or an element (not shown) external to Security Module 210. For example, a Content Validation component of Security Module 210 can be configured to ascertain the legality of the uploaded textual content, a crucial aspect of content creation and distribution. Content Validation component can be configured to cross-reference uploaded material against predefined legal parameters and standards. The Content Validation component ensures that the textual content uploaded by users adheres to certain terms and conditions of the system, and/or with broader legal requirements. It can be configured to perform validation to verify whether users have the necessary rights or permissions to use the content for video creation.

In some embodiments a Content Validation component can perform processes to prevent copyright infringement and to ensure that the system is not used for distributing unauthorized or copyrighted material. The Content Validation component thereby can function as a gatekeeper to safeguard both the users and the platform from potential legal complications arising from the unauthorized use of protected materials. After receiving the user input, Text-to-Scene Transformation (TST) Module 203 processes and structures the text into discernible scenes. AI algorithms within this module break down narratives, distinguishing between settings, characters, and actions. For example, if the input describes a mountainous landscape at dusk, the algorithms extract core elements such as mountains, setting sun, sky colors, and associated elements.

In some embodiments, TST Module 203 can be configured to integrate neuroscience principles into its video generation process. For example, TST Module 203 can be configured to analyze and optimize the narrative structure of uploaded text, enhancing engagement and memorability. This approach can provide advantages in educational and training contexts, for example, by automating the generation of content where information retention is critical.

In various embodiments, TST Module 203 is configured to transform standard material into narratives that are both engaging and memorable. TST Module 203 can employ, for example, AI algorithms developed and refined using specialized modeling data, to identify and apply effective storytelling techniques. These algorithms can analyze texts for one or more narrative elements such as emotional arcs, character development, and plot structuring, thereby enhancing the narrative to increase its relatability and impact.

In some embodiments, the AI-generative system provides via a user interface (e.g., via User Interface Module 202) a user-selectable Enhanced Storytelling feature. Accessible through the user interface, this feature allows users to opt for an additional layer of narrative enhancement. Upon activation, the system applies AI-generative narrative techniques to the uploaded content, facilitating the AI-driven generation of content that may be informative but also engaging and memorable.

In some embodiments, the system is configured to integrate metaphorical and other narrative elements into educational content. This integration transforms traditional educational materials into formats akin to storytelling, thereby making the generated content more engaging and easier to remember. This functionality is aligned with the cognitive principle that narratives, especially those involving metaphors, are more effectively absorbed and retained by the human brain.

In some embodiments, TST Module 203 incorporates a feedback loop mechanism (e.g., via Support and Feedback Module 209 discussed below) to evaluate the effectiveness of the storytelling elements. This mechanism utilizes user engagement and retention metrics to assess the impact of the storytelling. The feedback loop facilitates continual refinement of the storytelling algorithms, ensuring that the generated narratives are optimally tailored for educational impact and audience engagement and/or retention.

Scene-to-Image Module 204 then produces visual representations for each scene. It applies AI image generation techniques to create detailed and contextually accurate images, ensuring a visual representation that aligns with the narrative.

Image-to-Animation Module 205 animates these generated scenes. This module identifies motion trajectories within the images and applies them to produce coherent animations. It ensures the transition from one frame to another flows naturally, encapsulating the essence of the narrative.

In parallel or sequence, Text-to-Speech Converter 206 transforms textual dialogues or descriptions into voiceovers. Employing voice synthesis technologies, it can adjust voice outputs to match tonality, emotion, and context. Users have the option to select among various voice types, upload existing audio, or generate narration using their voice (or a model trained on their voice, for example), and adjust speech parameters.

Data Storage Module 207 manages and stores all content, from images and animations to voiceovers and metadata. Efficient database management ensures organized storage, fast retrieval, and redundancy checks.

Once users finalize their AI-generated videos, Export and Share Module 208 offers various render options. Users can output videos in multiple formats and directly upload them to platforms like YouTube or educational platforms. Additionally, the module may provide links to cloud storage solutions for user convenience.

For user assistance, Support and Feedback Module 209 contains resources like interactive guides, video tutorials, and elements to support user feedback. In some embodiments, Support and Feedback Module 209 may also integrate with tutorials, chatbots, and/or other support mechanisms to address user queries promptly. Ensuring system and data security, Security Module 210 applies encryption methods, establishes rigorous user authentication protocols, and monitors system activities to prevent potential breaches. System 200 can thereby be provided to transform textual content into animated videos, integrating technologies, and incorporating user experience, and high data security standards.

Additionally, system 200 can also include API Gateway 220. API Gateway 220 can be configured to permit third-party developers to interact with the functionality provided by system 200. Through API Gateway 220, developers can access Text-to-Scene Transformation Module 203, Scene-to-Image Module 204, Image-to-Animation Module 205, Text-to-Speech Converter 206, and other modules for customization or extension purposes. In an embodiment, API Gateway 220 supports RESTful interactions, allowing for easy integration with various programming languages and software environments. API Gateway 220 ensures that external requests are authenticated and authorized, usually by using token-based authentication methods. This ensures that only authorized users can access the system's capabilities.

API Gateway 220 can be configured to perform additional functions. For example, API Gateway 220 can be configured to permit third-party applications to upload textual content directly to system 200, bypassing User Interface Module 202. It can also configured to programmatically retrieve the animations, images, and voiceovers generated by the system for use in external applications. For example, an educational software may use API Gateway 220 to generate animated illustrations for an interactive e-book. In a non-limiting example, a gaming platform could employ the API to dynamically create animated cut-scenes based on player-generated content.

Figure 3:
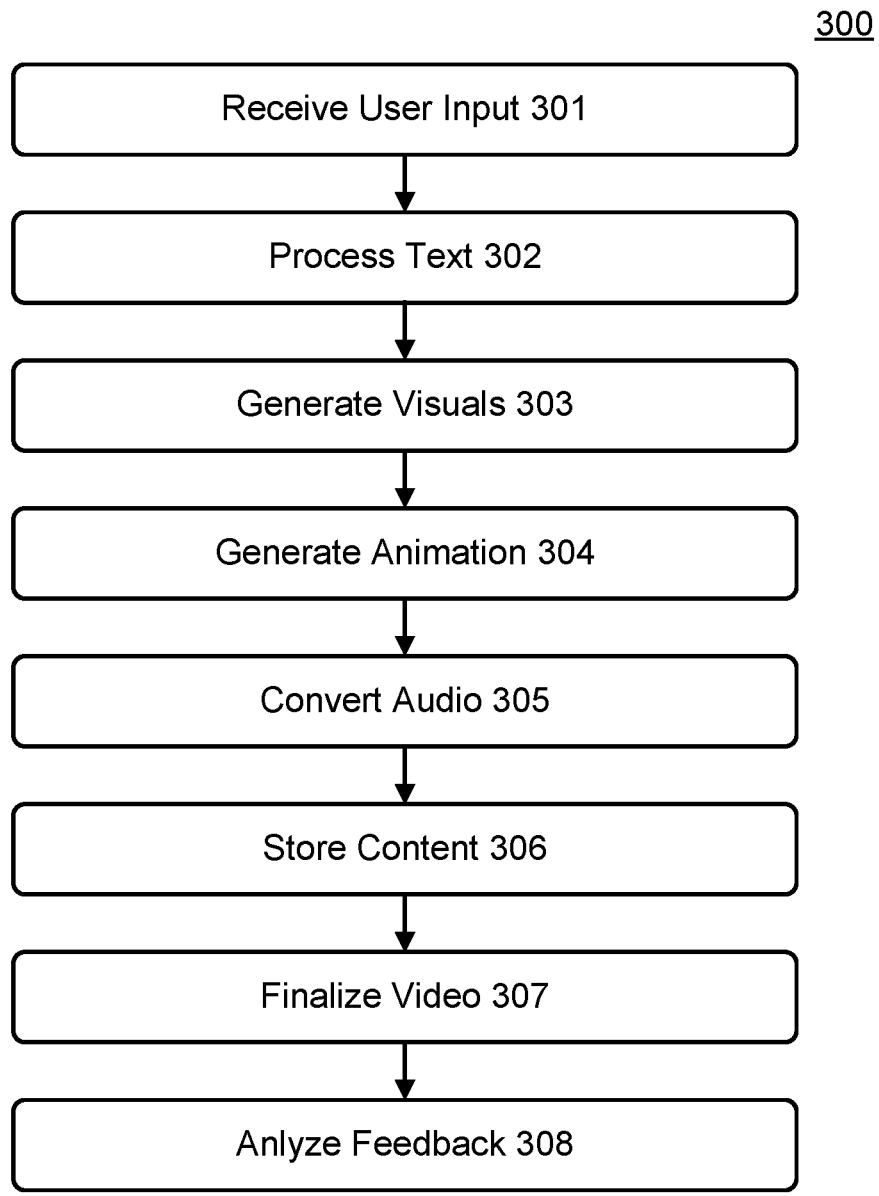
FIG. 3 is a flow diagram of a method for translating textual content into animated videos, according to some embodiments.

FIG. 3 outlines process 300 for translating textual content into animated videos via system 200. At operation 301, User Interface Module 202 receives textual content from users. Acceptable textual input includes narrative descriptions, book chapters, and dialogues.

At operation 302, Text-to-Scene Transformation Module 203 processes the incoming text. This module identifies and categorizes elements such as setting, character interactions, and events. In an example, if the text describes a rainy evening in a city, the module identifies rain, the evening setting, city landscape, vehicles, and pedestrians.

At operation 303, Scene-to-Image Module 204 creates visual representations of the identified scenes. It generates images that align accurately and contextually with the text. For example, text describing a beach will produce an image featuring the sea, sand, and beachgoers.

At operation 304, Image-to-Animation Module 205 adds motion to the created images. It bases the animation on the narrative flow and context, ensuring logical progression from one scene to another in sync with the story.

At operation 305, Text-to-Speech Converter 206 turns dialogues or narrations into audio. It uses voice synthesis technology to produce audio that matches the required emotion, tone, and pace.

At operation 306, Data Storage Module 207 stores all the generated content. It organizes the stored material for quick retrieval and applies measures for data redundancy and integrity.

At operation 307, users interact with Export and Share Module 208 to finalize the animated video. The module allows for export in various resolutions and formats and can generate direct sharing links to video platforms or educational portals.

At operation 308, Support and Feedback Module 209 intervenes if users experience difficulties or wish to refine their projects. This Support and Feedback Module 209 provides resources like step-by-step guides and video tutorials but also captures user feedback for ongoing improvement. In an embodiment, Support and Feedback Module 209 deploys machine learning algorithms to analyze the feedback and correlate it with specific processes or outputs from the prior modules in real-time.

For instance, if the user comments that the animation speed feels too fast, this feedback routes back to operation 304, i.e., to Image-to-Animation Module 205 for adjustments. Here, the machine learning algorithm recalibrates the animation speed parameters according to user preferences, slowing down the speed for better comprehension or enjoyment.

In another example, if users report that voice synthesis from Text-to-Speech Converter 206 lacks emotional resonance, the algorithm examines the audio output's emotional markers. It then adjusts the voice modulation settings to imbue the synthesized voice (e.g., at operation 305) with more natural intonation and emotion, making the audio more relatable and engaging.

If the feedback indicates dissatisfaction with the visual elements, such as the color scheme or image quality, the module communicates this to Scene-to-Image Module 204 (e.g., operation 302). In such case, the system can adjust its image generation algorithms to favor different color palettes or improve image resolution. This adjustment enhances the visual fidelity of the animated video, aligning it more closely with user expectations.

Feedback concerning data retrieval speed or difficulties encountered with stored projects are output to Data Storage Module 207. The algorithm then refines the data indexing and retrieval processes to ensure quicker and more accurate access to stored content.

In situations where users have multiple comments spanning different modules, the Support and Feedback Module 209 can employ a prioritization algorithm. This algorithm ranks feedback based on urgency and impact, ensuring that critical issues receive attention first. Support and Feedback Module 209 can then distribute the prioritized feedback to the corresponding modules for action.

Automated feedback mechanisms enable a dynamic and iterative improvement cycle, allowing for near-instantaneous modifications to the video and audio content, significantly reducing the time and effort needed for manual revisions. By integrating user feedback in real-time, the system ensures the end product meets or exceeds user expectations, thus elevating the overall user experience. Support and Feedback Module 209 also archives the analyzed feedback, along with the implemented changes, in a centralized database. This information serves as a valuable resource for future updates or for refining the machine learning algorithms, enabling a continually improving, adaptive system.

Also at operation 308, the user has the option to preview the refined video and audio content, confirming that the adjustments align with their feedback before finalizing the project. Thereby, process 300 transforms textual content into an animated video, utilizing one or more technology endpoints in combination with user experience and feedback.

In an embodiment, the system incorporates neuroscience principles into the AI-generating video process. This integration is grounded in the understanding that effective storytelling significantly enhances neural activity, leading to better retention and comprehension of information. The system leverages this concept by analyzing the narrative structure of the uploaded text and optimizing it for heightened engagement and memorability. This approach is particularly beneficial in educational and training contexts, where retention of information is paramount.

Figure 4:
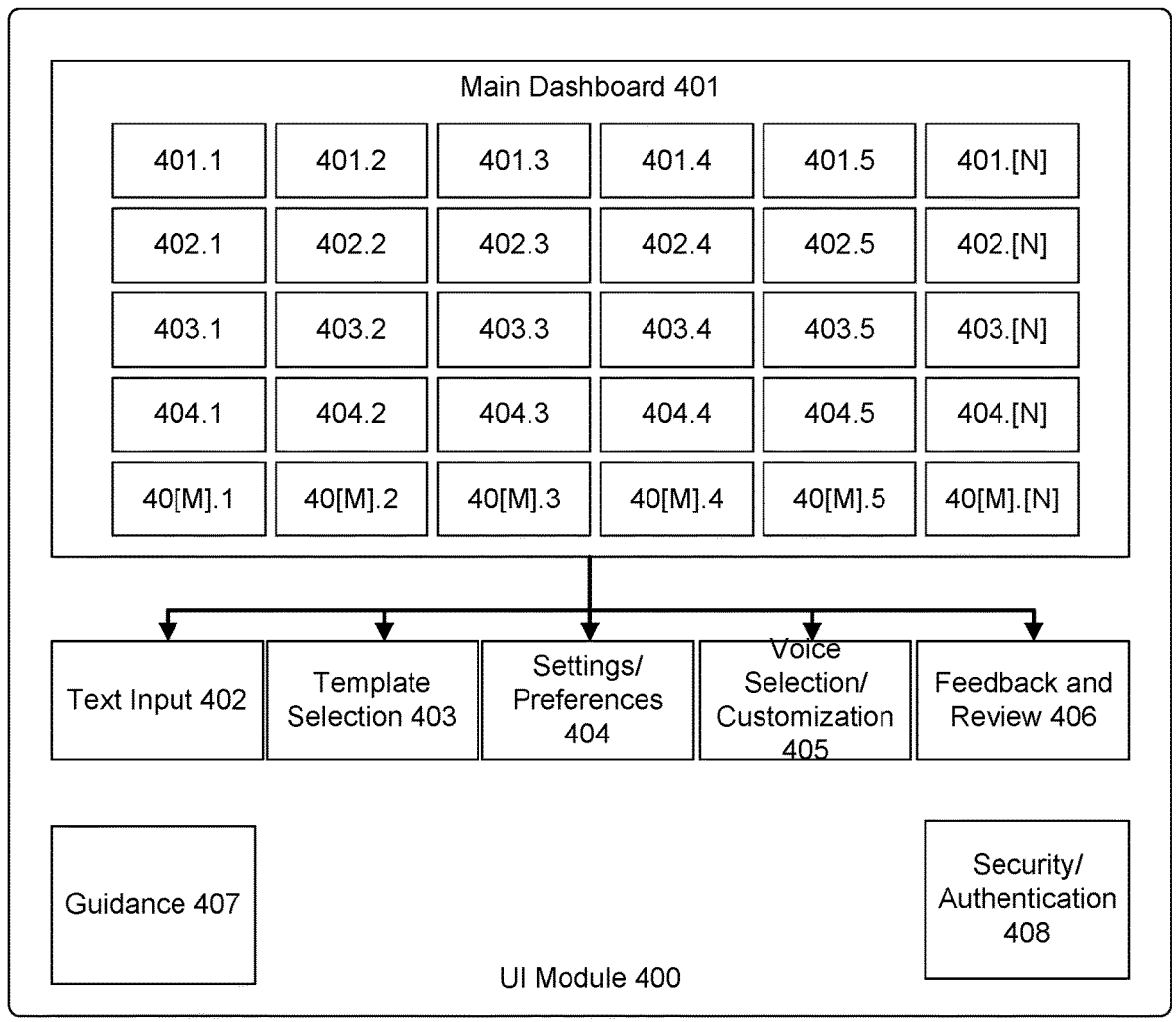
FIG. 4 is an illustration of embodiments of a User Interface Module, facilitating interaction between users and the AI-driven video production system, according to some embodiments.

FIG. 4 depicts User Interface Module 400, which facilitates the interaction between users and the AI-driven video production system 200. The interface design prioritizes case of use while enabling access to unconventional functionalities.

Upon accessing the User Interface Module 400, users encounter the Main Dashboard 401. This dashboard provides a visual overview of ongoing projects, a repository of previously generated videos, and quick links to initiate new projects. Icons, progress bars, and thumbnails offer visual cues, enhancing navigation.

In an embodiment, Main Dashboard 401 provides a central interface where users interact with their projects. In one non-limiting example, Main Dashboard 401 can include a two-dimensional grid layout encompasses elements designated as 401.1 to 401.M.N. Each row of the grid can represent a distinct scene parsed from the user-supplied text, while each column contains configuration elements that users can adjust to fine-tune their animated videos.

For example, elements in column 5, e.g., ranging from cell 401.1.5 to 401.M.5, may specifically pertain to negative prompts for stable diffusion processes across each scene, from 1 to M. Negative prompts can serve as explicit instructions to the system's AI, directing it to avoid specific actions or attributes in the animated output. These could range from excluding certain color schemes to preventing the addition of particular background noises. In a non-limiting example, an element at grid coordinate 401.3.5 could contain a negative prompt that instructs the system not to use any rapid scene transitions in the third scene, thus providing a more effective depiction of visual elements.

The grid's interactive nature allows users to click on each cell to either edit existing configurations or add new ones. This interactive feature provides the user granular control over each scene's parameters. For instance, clicking on the element at grid coordinate 401.2.7 might allow the user to adjust the voice modulation for dialogues in the second scene.

Visual cues, such as icons and color coding, can be present in each cell. These cues assist users in quickly identifying what each configuration element controls. Additionally, hover tooltips provide brief explanations or tips, offering users real-time assistance without requiring them to navigate away from the dashboard. The dashboard may also include a drag-and-drop feature that allows users to reorder scenes or move configuration elements between different scenes. For example, if a user wants to apply the same character design settings from scene 1 to scene 4, they can simply drag the settings from element 401.1.X to 401.4.X. This feature eliminates the need for redundant steps, streamlining the production process.

In another embodiment, a batch-editing feature enables users to select multiple cells and apply the same configuration setting across them. This is especially useful for applying global settings or features that should remain consistent across multiple scenes. For example, selecting elements 401.1.5 to 401.M.5 and applying a universal negative prompt ensures that the same diffusion stability measures are applied across all scenes.

The grid layout in Main Dashboard 401 therefore functions as a highly flexible and customizable control panel, enabling users to intricately tailor each scene in their animated videos while also providing the means for quick and global adjustments.

Text Input Panel 402 can enable users to upload or directly type textual content, including scripts, narratives, or book chapters. The panel offers text editing tools, enabling formatting, corrections, and annotations. Users can also integrate hyperlinks or external content references.

Template Selection Panel 403 provides a library of predefined animation templates, scene settings, and character designs. For example, thumbnails can provide visual previews, and hover tooltips offer descriptions, aiding users in making informed choices.

Settings and Preferences Panel 404 allows customization. Users can adjust animation speeds, voice tonalities, scene durations, and transition effects. Sliders, dropdown menus, and toggle switches enable these adjustments.

Voice Selection and Customization Panel 405 can be configured to provide voice type options, accent choices, and modulation settings. Users can preview voice samples, ensuring the chosen voice matches the desired emotion and narrative tone.

Feedback and Review Panel 406 permits users, after viewing the AI-generated videos, to provide feedback through text comments, rating scales, or by marking specific segments of the video. Timestamp-based annotations can ensure precise feedback.

Tutorial and Guidance Panel 407 can contain interactive guides, step-by-step walkthroughs, and video demonstrations, ensuring users can effectively utilize all features of the interface. Security and Authentication Panel 408 manages user access. Features like biometric scans, two-factor authentication, and encrypted password entries ensure data security and authorized access. Thereby, User Interface Module 400 can be provided to bridge a user's vision with the system's AI capabilities, facilitating content transformation into animated videos.

Figure 5:
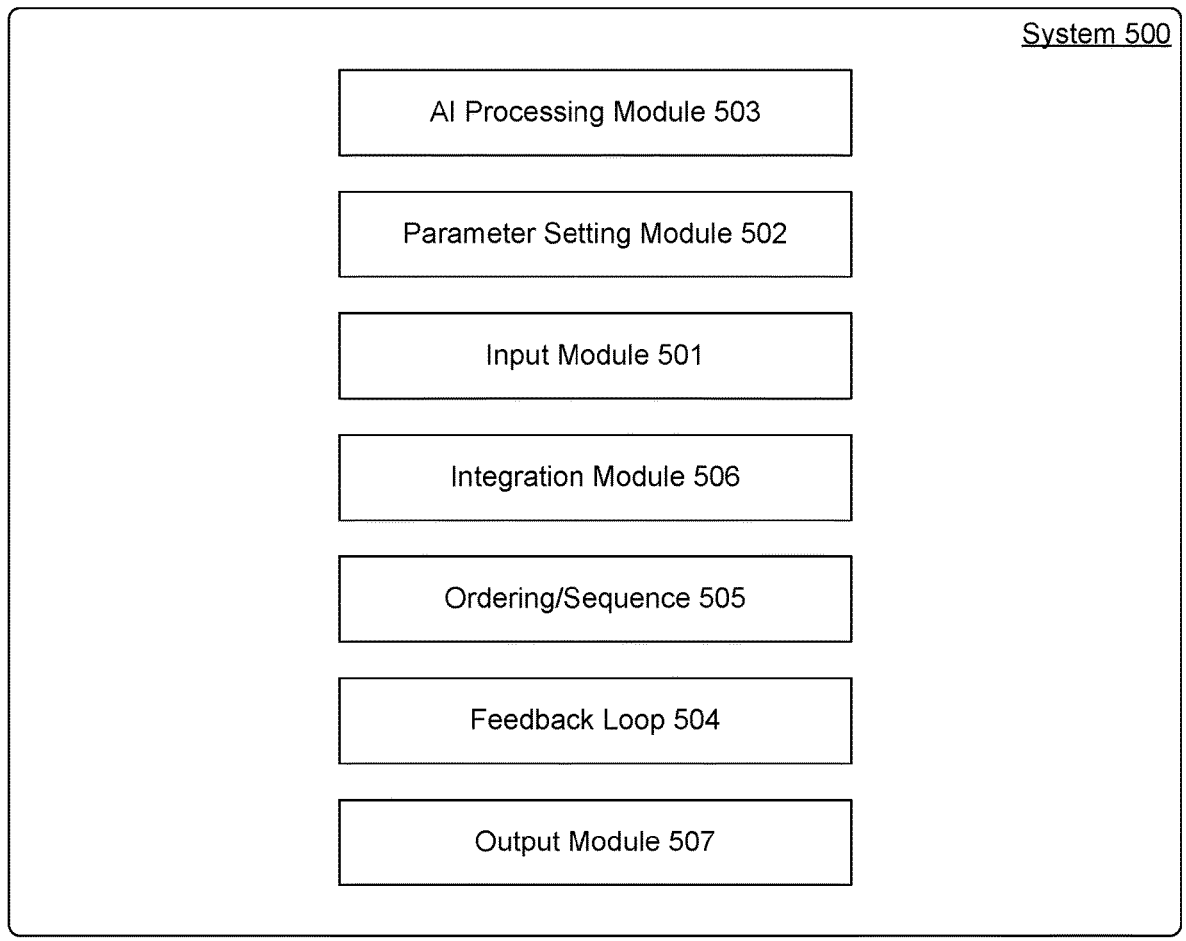
FIG. 5 is an example operating environment of a system architecture 500 for converting text-based content into visual animations or videos using artificial intelligence (AI) tools, according to some embodiments.

FIG. 5 illustrates a system architecture 500 for converting text-based content, such as PDFs, text documents, and audiobooks, into visual animations or videos using a combination of artificial intelligence (AI) tools.

Input Module 501 processes and segments textual content, with a primary focus on handling audiobooks. The module accepts large volumes of text, dividing them based on structural elements such as chapters and paragraphs. In an embodiment, input module 501 accepts text-based content. This content can be from an audiobook, a written book, or any text-based source. The input module 501 processes the content and prepares it for conversion into visual animations.

Parameter Setting Module 502 interprets the text, and can be configured to employ one or more algorithms, for example NLP algorithm(s), to discern contextual information, emotions, undertones, and themes. PSM 502 receives segmented text from Input Module 501 and translates it into parameters that guide the AI-driven visual representation process. The module can be configured to incorporate a feedback loop, such as feedback and refinement module 507, for iterative refinement, providing that the translation from text to visual parameters aligns with the content's intent. PSM 502 enables users and/or the system to set specific parameters for the conversion process. These parameters determine how the AI will interpret the text content, taking into account context, emotions, and specific scenes described within the text.

In some embodiments, PSM 502 acts as the intermediary between raw text input and AI-driven visual output. PSM 502 can interpret textual content and establish the guiding parameters for generating corresponding visual representations. The module performs translation functions, in addition to discerning intricacies within the text.

PSM 502 employs a series of specialized algorithms. These algorithms are configured to extract and understand the text's context, detect underlying emotion, recognize subtle undertones, and identify overarching themes. The efficiency and accuracy of these algorithms have been refined through numerous iterations, trials, and feedback cycles, ensuring they capture the essence of the textual content comprehensively.

Upon receiving segmented text from Input Module 501, PSM 502 begins its interpretative process. It breaks down the content into smaller, manageable units, analyzing each for its inherent meaning, mood, and significance. Each textual segment undergoes a rigorous examination, with the module's algorithms capturing critical information that determines how the segment should be visually represented.

The translation of text to visual parameters can be intricate. In some embodiments, parameters may not be arbitrarily defined but tailored based on the textual content's specific attributes. For instance, if a segment of the text conveys a somber mood, the algorithm may set parameters that guide the AI tools towards darker, muted visuals. Conversely, a jovial or light-hearted segment might result in brighter, more vibrant visual parameters. The depth of the module's interpretative capabilities ensures that the AI-driven visuals produced are not just arbitrary images but are contextually relevant and resonate with the content's spirit. PSM 502 can be configured to provide a feedback loop mechanism/interaction with Feedback and Refinement module 504. The feedback loop allows for iterative refinement to produce parameters that correspond accurately to the input. In some embodiments, after initial parameter setting and subsequent visual generation, results can be reviewed and compared against the original text. If discrepancies or misalignments are detected, the system flags these deviations. The module then revisits the parameter-setting phase, making necessary adjustments to better match the content's intent. This iterative process can be repeated multiple times, providing that the final visual output closely mirrors the essence and intent of the textual input.

In practice, the feedback loop can be configured to manage complex or nuanced content. Certain content, like audiobooks or intricate texts, may pose challenges in translation due to their depth and layered meanings. The iterative refinement process aids in navigating these complexities, providing that even challenging content receives an accurate visual representation.

To further enhance precision, PSM 502 can store and reference past parameter sets. By archiving successful parameter combinations that resulted in accurate visual translations, the module builds a repository of 'best practices.' When processing new content, it can reference this repository, drawing on past successes to expedite and improve current and future parameter setting processes.

PSM 502 bridges raw textual content and meaningful visual representation, providing that the visual outputs are not mere illustrations but are comprehensive visual translations of the text. Through algorithms, including iterative feedback mechanisms, and/or training, the module supports the text-to-visual translation.

System 500 additionally includes AI processing module 503. AI processing module 503 utilizes one or more AI tools and APIs, including image generation tools and/or tools specifically configured for video creation. AI processing module 503 interprets text, guided by the set parameters, to produce corresponding visual content.

A feedback loop 504 can be integrated into the system. This loop allows for the refining of parameters based on the visual outputs generated by the AI processing module 503. If the generated visuals are not satisfactory, adjustments can be made in PSM 502, and the content can be processed again.

In a non-limiting example, the system can also have an ordering and sequencing module 505. This module sequences the generated visuals in an order that aligns with the text-based content, providing a coherent flow in the final video.

The system also includes an integration module 506, which receives the visuals from the AI processing module 503, sequences them, and synchronizes them with the original audiobook or text-based content. This module may also add additional elements, such as audio, including sound effects, and/or background music, for example, to enhance the final video.

The output module 507 provides the final video or animation. This video combines the visuals generated from the text with the original audio, offering a multimedia experience that visually represents the content of the original text.

In an embodiment, the system can handle challenges such as translating the content into multiple languages, adjusting the visuals based on cultural context, or integrating different styles of animations based on user preferences or the nature of the content.

The system architecture 500 described ensures a streamlined process, from inputting the text-based content to generating a visual representation that aligns with the original content's intent and context.

Figure 6A:
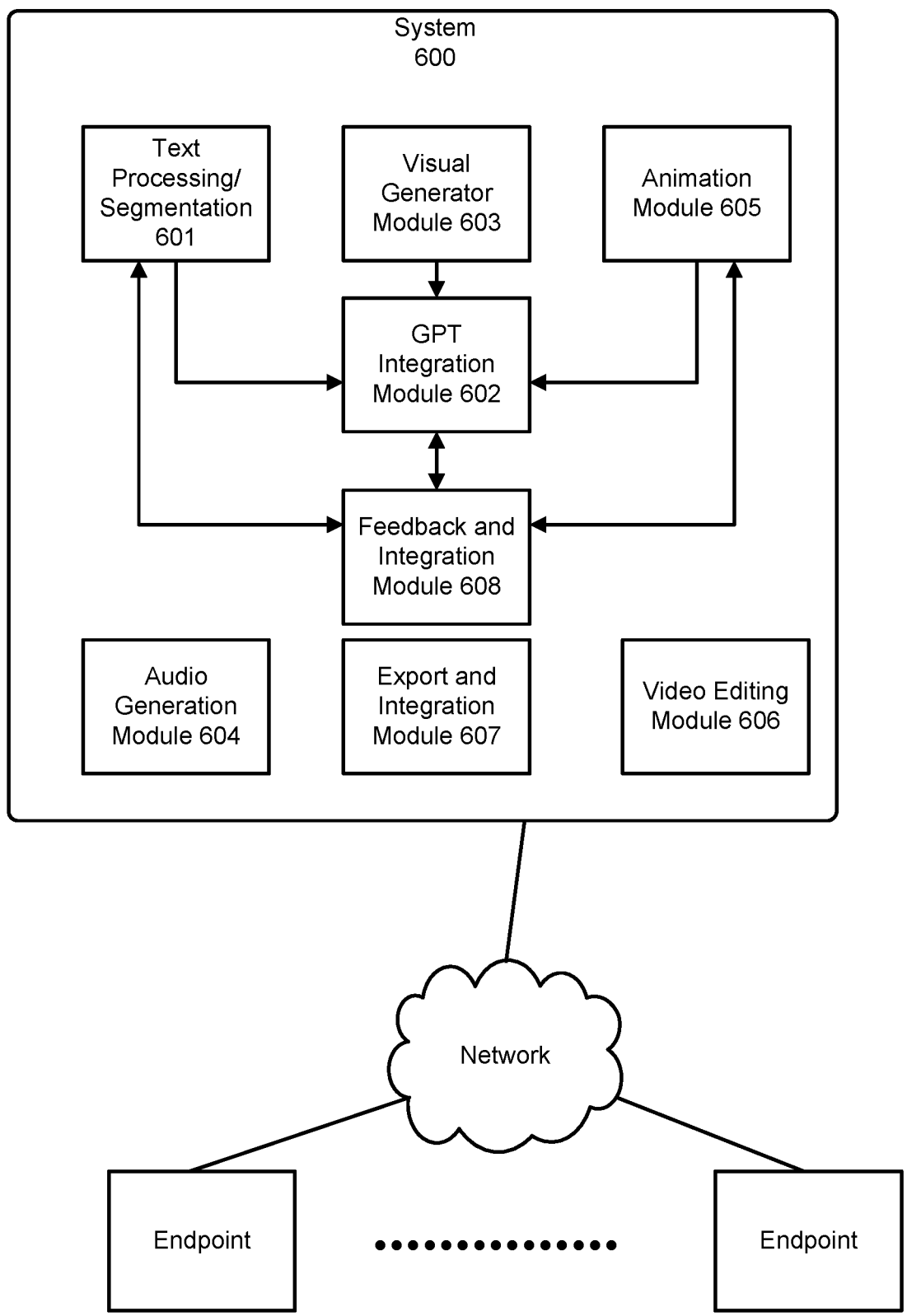
FIG. 6A is an illustration of a system for converting textual content into videos, according to some embodiments.

FIG. 6A illustrates another embodiment of a video generation system 600, which can be an embodiment of systems described in this disclosure, including system 200, to convert textual content from books into educational videos. The system leverages multiple platforms, with each specialized in distinct functionalities to ensure precise, efficient, and effective transformation of content.

Text Processing and Segmentation Module 601 enables users to upload their content, either as PDFs or documents with readable text. This module performs initial processing, breaking down the content into distinct sections, such as chapters and sub-chapters, to extract relevant parts for video conversion.

GPT Integration Module 602 facilitates content summarization, using algorithms to identify core elements and messages within each section, creating a summarized version of the original content. GPT Integration Module 602 permits concise, impactful videos that retain the essence of the textual material.

Visual Generator Module 603 receives the generated summaries as input prompts and creates visualizations. It employs a visual generation endpoint, for example a generative AI tool dedicated to image creation (such as Stable Diffusion, Stability.AI or the like), to produce contextually relevant images for each scene. Each pixel of the generated image can be generated based on the prompts, providing visuals that align effectively with the content's context.

Additionally, Narration Generation Module 604 can be configured to receive the text and utilize AI generative tools to transform the text into speech. Narration Generation Module 604 can alternatively be configured to receive audiobook files or to transform text into audio speech, utilizing one or more algorithms to synchronize the audio components. System 600 can enable user customization to choose voice types, adjust tonalities, and ensure the generated voiceover can be congruent with the mood and message of the content.

Animation Module 605 receives the generated images and brings them to life. Each image serves as a base frame, and through a combination of AI algorithms and predefined settings, animations are created. This process considers the duration of the narration, the content's context, and ensures smooth transitions between frames. Specific parameters like animation speed, scene transitions, and image sequences are optimized for each segment.

Video Editing Software Module 606 integrates all the elements-visuals, animations, and narration. It stitches together the micro-modules, aligning them with the text document's (e.g., book's) structure, providing a coherent flow from one segment to the next. This module also offers a preview feature, allowing users to review, edit, and give feedback on the generated video.

Upon finalization, Export and Integration Module 607 enables users to publish their videos. Whether it's platforms like YouTube or Vimeo or more specialized educational platforms, the system facilitates compatibility and content uploads. Additional integrations might include Learning Management Systems (LMS) for educational institutions.

Feedback and Iteration Module 608 allows users to pinpoint specific areas of improvement in the generated video, making it an iterative process where users can refine and perfect their content.

Feedback and Iteration Module (FIM) 608 serves as the final step in the video generation system 600, focusing on quality control and refinement of the generated educational videos. FIM 608 enables users to scrutinize the end product, identify areas for improvement, and make necessary revisions to enhance the overall quality of the content.

In an embodiment, FIM 608 can be configured with a user interface that directly integrates into system 600. FIM 608 provides functionalities such as video playback, annotation tools, comment sections, and specific time-stamping features. Users can watch the generated video and pause at any moment to annotate areas that require improvement, changes, or additional information.

FIM 608 can be configured utilizing data analytics algorithms to analyze feedback, including the textual feedback provided by the user. Sentiment analysis can identify whether the feedback is positive, neutral, or negative, and categorize it accordingly. Keyword extraction can pick out recurring themes or topics in the feedback, drawing attention to the most frequently mentioned areas for improvement. Automated processes within the module can include real time categorization of feedback. When a user inputs a comment or annotation, machine learning algorithms classify the feedback into various buckets such as 'Audio Quality,' 'Visual Aesthetics,' 'Content Accuracy,' etc. Automated sorting and categorization enables revisions in other modules of system 600. For example, if feedback frequently falls into the 'Audio Quality' category, Narration Generation Module 604 can be flagged for review and potential modification to the module itself or to the endpoint. To facilitate iterative development, the module can also incorporate version control systems. When a user requests revision based on feedback, a new version of the video may be created without overwriting the original. This iterative aspect can be configured to employ standard version control systems, for example Git or the like, to manage multiple iterations of the video. Users can therefore easily revert to previous versions, compare different versions, or merge changes as needed.

Moreover, the module can interact with other modules in system 600 for integrating updates. For instance, if a user flags an issue with the visuals, the feedback can be directly sent to Visual Generator Module 603 for parsing into prompt adjustments. In addition, FIM 608 can incorporate one or more APIs can facilitate this level of inter-module communication, using RESTful API endpoints or GraphQL for data exchange.

As a non-limiting example, machine learning algorithms can also be trained to predict the quality of generated content based on historical feedback data. Over time, as users provide more feedback, the module can become more proficient at identifying not just current but also potential future issues, thereby enhancing the preemptive capabilities of system 600. Thereby, FIM 608 incorporates unconventional technologies for utilizing machine learning and NLP algorithms to refine video generation, feedback analysis and automation. The module facilitates the review and refinement process providing the high quality of the educational videos generated by system 600.

The described system 600 provides an integrated approach, catering to authors, educators, and thought leaders, enabling them to leverage their textual content, transform it into engaging educational videos, and reach a wider audience effectively.

Figure 6B:
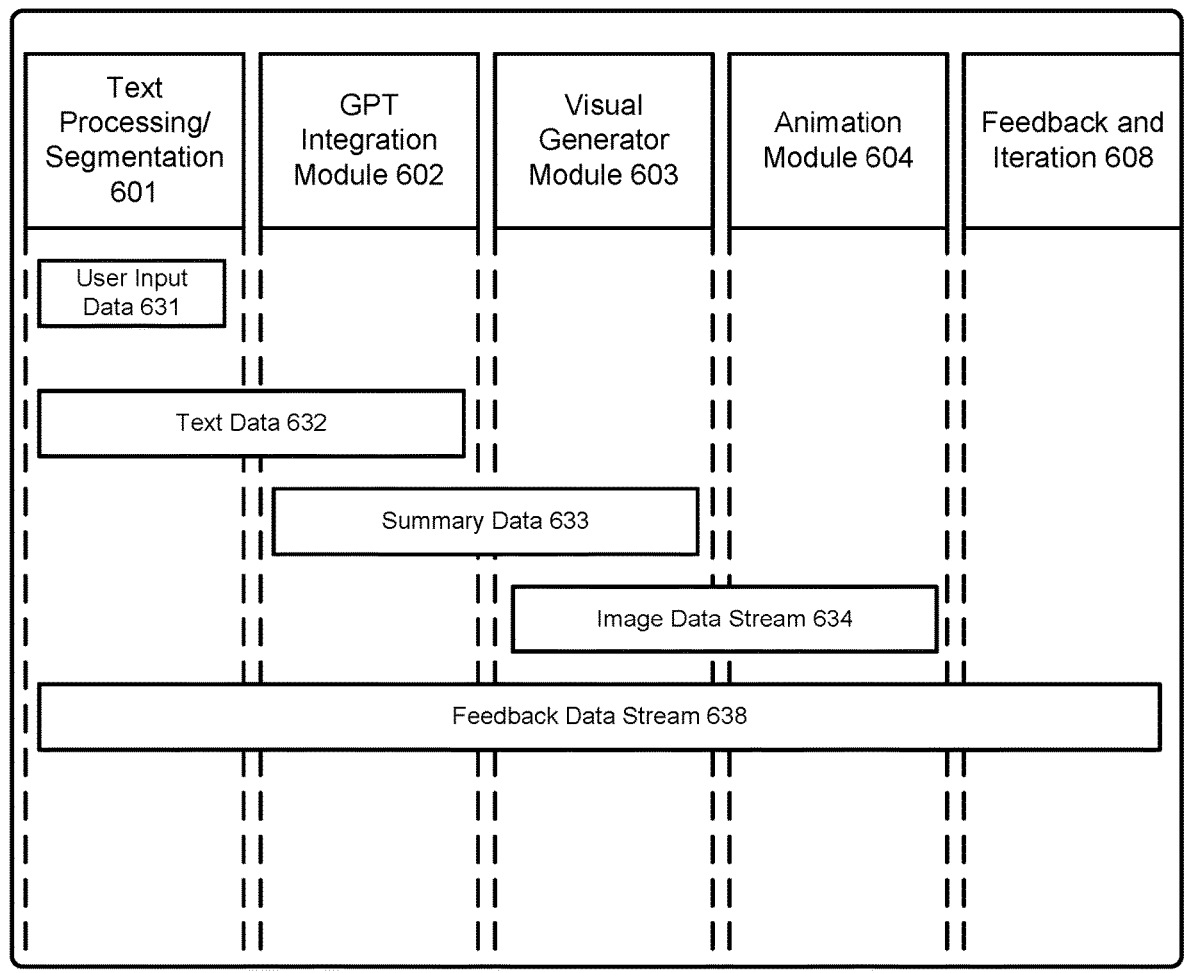
FIG. 6B is a flow diagram of data for transforming textual content into animated videos within the AI-driven video production system, according to some embodiments.

FIG. 6B depicts progression of data within the system 600, which can be an embodiment of other systems described in this disclosure, including systems 200, 500, and 600. Through a series of logical and automated steps, the system transforms user-provided textual content into visually rich and audibly clear animated videos. Referring to FIG. 6B, the data flow within the AI-driven video production system 600 is shown, including paths through which data transitions, gets processed, and is outputted for user consumption.

In an embodiment shown in FIG. 6B, data can progress specifically through five modules of video generation system 600: Text Processing and Segmentation Module 601, Visual Generator Module 603, Animation Module 605, GPT Integration Module 602, and Feedback and Iteration Module 608. In a non-limiting example, user input can be received in the system through User Input Data Stream 631 and communicated for initial processing to Text Processing and Segmentation Module 601. This module segments and structures the text into units such as chapters or sections.

From Text Processing and Segmentation Module 601, segmented data can communicate via Text Data Stream 632 to GPT Integration Module 602. Algorithms in this module parse and summarize the segmented text to identify key points for video conversion. The summarized text then flows to Visual Generator Module 603 through Summary Data Stream 633. In an embodiment of FIG. 6B, Visual Generator Module 603 can generate images that align with the textual content, utilizing generative AI algorithms for this task. In some non-limiting examples, Generative Adversarial Networks (GANs) and Variational Autoencoders (VAEs) can be used. GANs can include a generator network that creates images and a discriminator network that evaluates them. The generator network takes a random noise vector as input and produces synthetic images that the discriminator evaluates against real images. The generator improves its output iteratively, aiming to fool the discriminator. This allows the system to produce high-quality images that are contextually relevant to the text content. VAEs can encode input data as a fixed-size latent vector in a continuous space. The decoder takes this vector to regenerate data that resembles the original input. VAEs offer more control over the generated images because the continuous latent space allows for easy manipulation of image characteristics. For example, if the textual content specifies a "sunny landscape," the VAE can adjust parameters in the latent space to generate an image with bright lighting and clear skies.

In a non-limiting example, when generating a scene described as "a crowded marketplace," a GAN may focus on producing intricate details such as individual market stalls, people, and products. Meanwhile, a VAE may allow for adjustments like the time of day or weather conditions in the generated image based on additional textual cues or system settings.

In some embodiments, Visual Generator Module 603 may combine both GANs and VAEs for hybrid capabilities. For example, a VAE could generate a basic framework of the image while a GAN refines the details, relying on strengths of both algorithms. Visual Generator Module 603 can be configured to interface with other modules through API endpoints, allowing data exchange and collaborative filtering for better image generation.

Generated images 634 can proceed to Animation Module 605 through Image Data Stream 635, where algorithms and predefined settings animate the images. In some embodiments, parameters like speed and transition effects can be optimized here.

Animation Module 605 can be configured to employ specific algorithms to animate images. For example, Animation Module 605 can utilize stable diffusion as an algorithmic technique for animating images received from Visual Generator Module 603 via Image Data Stream 635. Stable diffusion focuses on providing that the transition from one image state to another happens in a way that minimizes abrupt or jarring changes, particularly useful in scenarios like fluid simulations or natural scene evolutions.

In an embodiment, stable diffusion can use partial differential equations (PDEs) to mathematically describe how image attributes such as color, brightness, or shape should change over time. The algorithm starts by dividing the image into a grid, where each cell represents a pixel or a group of pixels. It then calculates the 'diffusion' of these attributes between neighboring cells over discrete time steps. Constraints can be applied to ensure that the diffusion process adheres to physical laws or artistic guidelines.

A stable diffusion process can integrate with other algorithms in the Animation Module 605. For example, it can be combined with keyframe interpolation to create more natural transitions between keyframes. It can also work in tandem with skeletal animation algorithms, providing an additional layer of realism by simulating the natural flow of materials like clothing or hair. Parameters such as diffusion rate and stability constraints can be optimized within the Animation Module 605. These parameters can be set manually, or a machine learning model can optimize them based on metrics like visual appeal or user engagement.

More specifically, keyframe interpolation can include defining starting and ending frames, and intermediate frames can be automatically generated to create smooth transitions. The cubic spline interpolation method could be another alternative, smoothing out the movement paths between keyframes by considering not just the start and end points but also the adjoining frames. In another non-limiting example, skeletal animation algorithms might be used, especially when animating complex objects like human or animal figures. For example, a virtual 'skeleton' comprising a hierarchy of bones and joints can be defined, and the static image can be 'skinned' onto this skeleton. Movement of the bones results in realistic animation of the image. Tweening algorithms can be employed for simpler animations. In this case, the starting and ending frames and the time duration are defined, and the algorithm computes the intermediate frames. This works well for simple shape morphing or color changes.

In terms of optimization, Animation Module 605 allows for the fine-tuning of various parameters. Speed can be controlled by altering the frame rate or the number of intermediate frames. Transition effects like fade-in, fade-out, or cross-dissolve can be incorporated, and their duration and timing can be set manually or through automated optimization techniques, like genetic algorithms, that consider user behavior or system performance metrics. If the system employs machine learning models to optimize these parameters, training data can be fed back into the system for constant improvement. The model could learn from metrics such as user engagement or manual adjustments made to the animations to improve future animations.

Feedback data on the effectiveness of the stable diffusion algorithm, as well as other algorithms employed in the Animation Module 605, can be collected and sent to the Feedback and Integration Module 608 via Feedback Data Stream 638. This data may include user interaction metrics or computational performance indicators, allowing for iterative refinement of the animation algorithms. The Feedback and Integration Module 608 analyzes this data and can adjust algorithmic parameters or recommend different animation techniques, thereby optimizing the overall system performance.

Feedback and Iteration Module 608 collects and analyzes user feedback through Feedback Data Stream 638. This stream captures various types of feedback, such as interaction times and textual comments. Algorithms categorize this feedback for targeted adjustments. For example, if feedback focuses on 'Audio Quality,' the system flags Narration Generation Module 604 for review. The Feedback and Iteration Module 608 also integrates with other modules to make adjustments based on user feedback. In advanced configurations, the module may use API endpoints for data exchange between modules. Additionally, the module incorporates version control systems, allowing for the creation of new video versions based on user feedback without overwriting original versions.

Feedback Data Stream 638 can be configured to capture a wide range of user interactions, including simple metrics as well as detailed commentary. Feedback Data Stream 638 can be incorporated into machine learning algorithms to categorize feedback in real time. If the feedback frequently relates to a specific aspect, this information flags relevant modules for adjustments. The Feedback and Iteration Module 608 can also be configured to use predictive algorithms to preempt issues in future content generation. Thereby, FIG.

6B provides a usage of system 600 to transform text into educational videos and enables improvements through robust feedback mechanisms.

Figure 7:
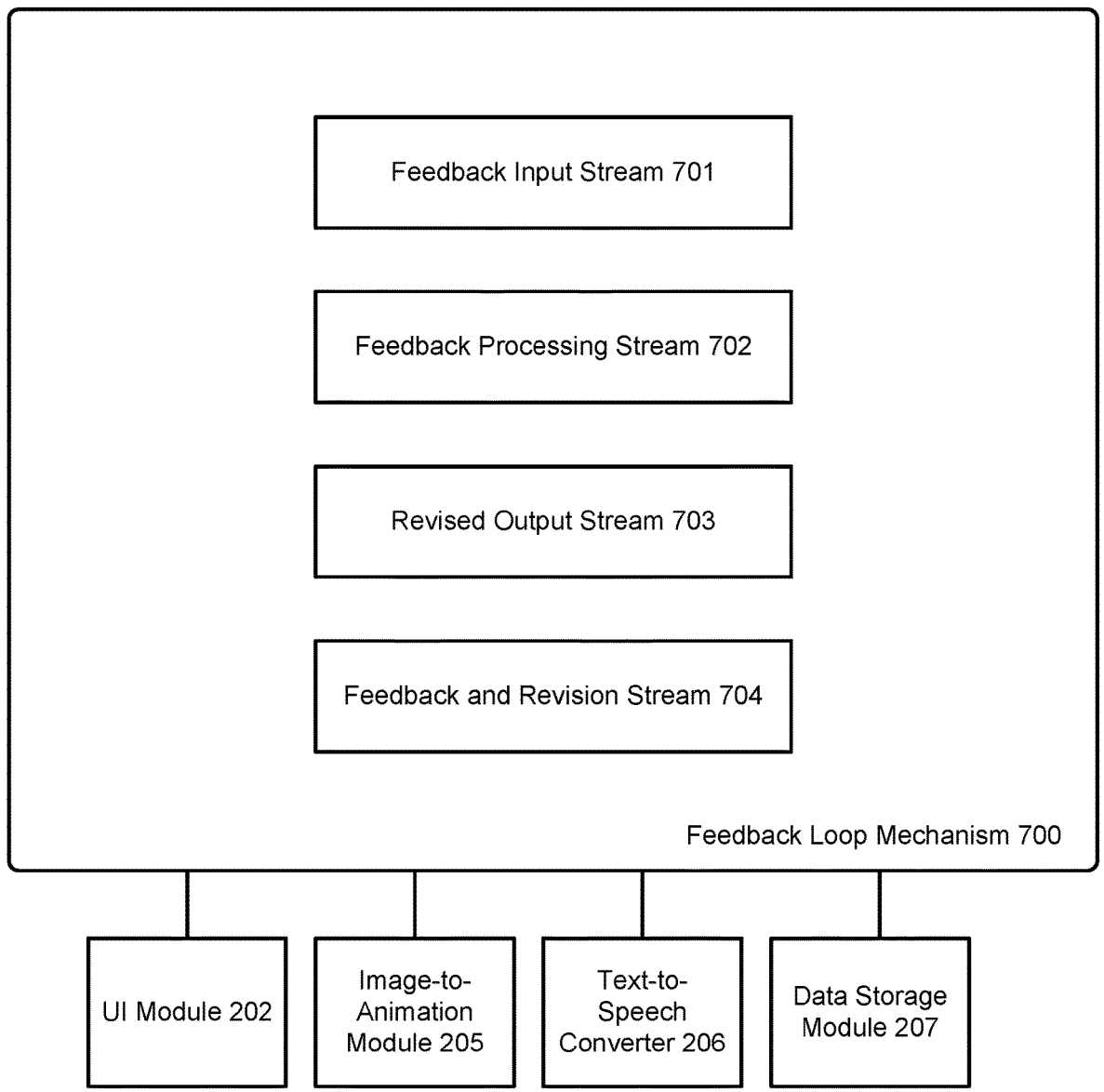
FIG. 7 is an illustration of embodiments of a feedback loop mechanism within the AI-driven video production system, according to some embodiments.

FIG. 7 depicts feedback loop mechanism 700 within the AI-driven video production system 200 enabling a disclosed video generation system (e.g., 200, 500, 600) to ingest user feedback, refines its processes, and continuously improves the output quality.

User Interface Module 202 can be used to initiate a feedback loop. After users view the AI-generated videos, they can provide feedback via the Feedback Input Stream 701. This stream captures detailed feedback regarding scene depiction, animation fluidity, voice tonality, synchronization, and overall satisfaction.

Core Processing Unit 201, being central to data management, receives this feedback and categorizes it based on its context. Different facets of feedback are directed to their respective modules. For instance, feedback about animation goes to Image-to-Animation Module 205, while comments on voice output are directed to the Text-to-Speech Converter 206.

Feedback Processing Stream 702, an intelligent sub-module within Core Processing Unit 201, employs algorithms to analyze patterns in the feedback. This analysis identifies common issues, user preferences, and emerging trends. The outcomes of this analysis aid in refining system algorithms, enhancing training data, and adjusting parameters to improve overall output.

Based on the feedback, the respective modules undergo iterative refinement. For instance, if users consistently indicate a mismatch between voice tonality and scene emotion, the Text-to-Speech Converter 206 adjusts its voice synthesis algorithms.

Post-refinement, users can again interact with the system, generate videos, and provide additional feedback, creating a continuous feedback loop. Revised Output Stream 703 ensures that the refined animations, images, or audio are presented to the user for further validation. Users can compare previous outputs with the revised ones, ensuring that their feedback has been incorporated.

Data Storage Module 207 plays a pivotal role in storing historical feedback and system responses via the Feedback and Revision Data Stream 704. This stored data serves multiple purposes: it helps in training the AI algorithms, provides a reference for future feedback, and tracks system evolution over time.

Thereby, feedback loop mechanism enables user feedback to be captured and implemented, driving continuous system improvement and ensuring alignment with user expectations.

Figure 8:
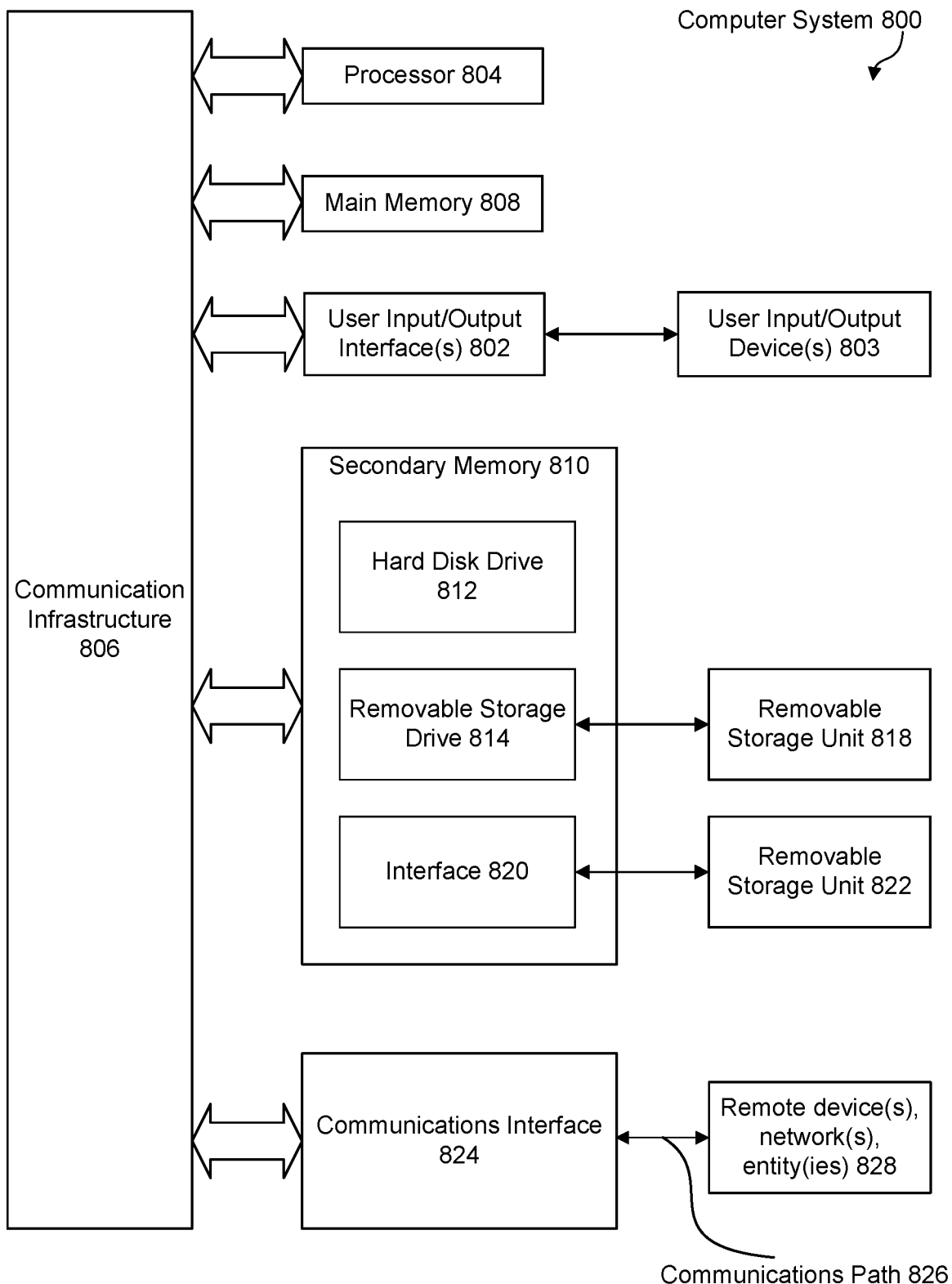
FIG. 8 is an illustration of embodiments of a computer device, according to some embodiments.

FIG. 8 is a block diagram of example components of device 800. One or more computer systems 800 may be used, for example, to implement any of the embodiments discussed herein, as well as combinations and sub-combinations thereof. Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random-access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814.

Removable storage drive 814 may interact with a removable storage unit 818. Removable storage unit 818 may include a computer-usable or readable storage device having stored thereon computer software (control logic) and/or data. Removable storage unit 818 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

What is claimed is:

1. A system for automated generation of educational videos from textual content, comprising:

a text analysis module comprising a natural language processing (NLP) engine configured to process educational content, the processing comprising extracting one or more thematic and/or narrative elements using an ontology training of the NLP engine specific to educational disciplines for facilitating accurate identification of educational concepts, themes, and/or narrative structures for improving engagement of educational videos;

a narration customization module comprising an artificial intelligence (AI) engine configured to generate one or more audio outputs based on dynamic selection and/or automatically customized narration parameters using a sentiment analysis algorithm to align voice-over emotion with educational content mood;

a visual content generation module comprising a generative-AI framework module is configured to utilize generative AI algorithms to create one or more unique, context-specific visual outputs directly from the analyzed textual content generating visual content specifically provided to complement the educational narrative;

an integration module comprising a multimedia assembly engine for merging the audio and visual outputs based on a timeline-based synchronization algorithm to align narrative pacing with visual transitions;

an adaptive interface module providing a graphical user interface (GUI) that enables real-time feedback-driven customization of the audio and visual outputs, the adaptive interface module comprising one or more machine learning models trained based on user preferences to improve recommendation accuracy over one or more iterations, wherein the system implements the one or more machine learning models trained based on neuroscience research to apply storytelling techniques that enhance educational video memorability and learner engagement.

2. The system of claim 1, wherein the text analysis module further comprises a contextual understanding component that applies deep learning techniques to differentiate between complex educational concepts, enhancing the system's ability to create nuanced educational videos, wherein the text analysis module is configured to process digital documents, and wherein the digital documents comprise one or more of Portable Document Format files (PDFs), text documents, image files, video clips, audio files, and/or any other digital file types.

3. The system of claim 1, wherein the integration module includes a user compliance verification feature configured to audit a final video output against a set of predefined educational standards and content guidelines, utilizing a rule-based logic system to flag potential deviations for review.

4. The system of claim 1, further comprising a management module configured to manage performance of one or more asynchronous tasks constrained by one or more allocated resources and performance of one or more synchronous tasks in real-time.

5. The system of claim 1, wherein the adaptive interface module is configured to allow users to provide feedback and revise the generated video, wherein the Feedback and Iteration Module employs machine learning algorithms to categorize feedback into specific areas such as audio quality, visual aesthetics, and/or content accuracy.

6. The system of claim 1, wherein the integration module performs one or more algorithms to align a final video output to the original textual content and enables a user-selectable option to indicate whether to perform summarization of the input textual content.

7. The system of claim 1, wherein the visual content generation module is configured to generate image prompts directly from narrative segments of the segmented textual content, with the accuracy of generated prompts being dependent on the clarity and specificity of the input text, and wherein the Visual Generator Module employs one or more generative AI tools selected from Generative Adversarial Networks (GANs) or Variational Autoencoders (VAEs), for image creation.

8. The system of claim 1, wherein the integration engine is configured to perform communication with an external API integration for narration generation enabling synthesis of customized narration audio that is synchronized with the dynamically generated visual content, wherein the API facilitates one or more voice modulation options to match an associated attribute of the educational content.

9. The system of claim 1, wherein the adaptive interface module is configured to iteratively refine educational video generation process based on user feedback, wherein the adaptive interface module:
    collects feedback from users regarding educational effectiveness, engagement, and/or clarity of one or more generated videos;
    processes the collected feedback using one or more machine learning algorithms to identify aspects for improvement in the content, narration, and/or visual presentation;
    automatically adjusts the parameters within the text analysis module, narration customization module, and/or visual content generation module based on the processed feedback to enhance the relevance and engagement of subsequent educational videos; and
    iteratively improves feedback processing and parameter adjustment based on a reinforcement learning model to progressively improve generation of educational videos customized based on user preferences and learning outcomes.

10. A computerized method for generating educational videos from textual content, executed on a computer system, comprising:
    analyzing, by a natural language processing (NLP) engine, the textual content to extract one or more educational themes, characters, settings, and/or narrative arcs, wherein the NLP engine implements one or more model training processes for educational content to distinguish informative, narrative, and argumentative text styles of the textual content to enhance learning engagement;
    customizing, by a narration customization module, voice-over settings to generate one or more audio outputs, the voice-over settings comprising one or more of tone, pace, gender, and/or emotional inflection parameters based on the extracted educational themes and narrative arcs, the narration customization module configured to implement a machine learning model trained on a dataset of educational video narrations to optimize voice-over parameters for educational retention;
    generating, by a generative artificial intelligence (AI) module, one or more visual outputs aligned with identified themes, wherein the AI module is configured to utilize generative AI algorithms to create one or more unique, context-specific visual outputs directly from the analyzed textual content generating visual content specifically provided to complement the educational narrative;
    integrating, by an integration module, the customized narration and generated visual content into a unified educational video, wherein the engine synchronizes voice-over with the visual outputs based on a temporal mapping algorithm, ensuring coherence between auditory and visual learning cues;
    adapting, by an adaptive interface module, the audio and visual outputs based on user inputs for theme emphasis, narration style, and visual preferences, the adapting using an AI recommendation system that suggests customization options based on one or more of user feedback and historical success rates of educational engagement metrics.

11. The method of claim 10, further comprising utilizing a legality verification engine within the narration customization module to ensure the selected voice-over parameters and content do not infringe on copyright laws, based on a database of copyright restrictions and educational licensing agreements.

12. The method of claim 10, further comprising adjusting, by the generative AI module, one or more visual generation parameters to facilitate generation of the visual outputs under varying system load conditions for ensuring scalable delivery of educational content, wherein the generative AI module comprises a real-time performance optimization feature configured to perform the adjusting.

13. The method of claim 10, wherein analyzing the textual content involves using the NLP engine to separate and identify narrative elements such as characters, dialogues, and/or setting indicators, for enhancing the identification of educational components within the textual content.

14. The method of claim 10, further comprising managing performance of one or more asynchronous tasks constrained by one or more allocated resources and performance of one or more synchronous tasks in real-time.

15. The method of claim 10, wherein the generative AI module uses computational geometry algorithms to transform identified narrative elements into one or more visual scene components, representing spatial relationships among objects and/or characters within the scene, and applies texture mapping, lighting, and/or shadow calculations to enhance the generated still images by a rendering engine.

16. The method of claim 10, wherein the generative AI module employs motion algorithms guided by heuristic methods based on the textual context to animate the still images, ensuring that the visual outputs align with the educational themes and/or narrative arcs.

17. The method of claim 10, wherein the narration customization module adjusts synthesized speech using a prosody model that maps narrative tone and/or pacing to one or more variations in pitch, rate, and/or intensity, thereby aligning audio output with the educational themes and/or narrative arcs.

18. The method of claim 10, further comprising storing the generated audio output, visual outputs, and associated user feedback in a data storage system using hierarchical indexing and sharding techniques to facilitate efficient retrieval and data-driven adjustments for future educational video generation.

19. The method of claim 10, wherein the machine learning algorithms in the feedback system are trained on a dataset that includes historical user interactions and feedback to make data-driven adjustments to the animated video.

20. A non-transitory tangible computer-readable device having instructions stored thereon that, when executed by a computing device, cause the computing device to perform operations comprising:

analyze, by a natural language processing (NLP) engine, the textual content to extract one or more educational themes, characters, settings, and/or narrative arcs, wherein the NLP engine implements one or more model training processes for educational content to distinguish informative, narrative, and argumentative text styles of the textual content to enhance learning engagement;

customize, by an artificial intelligence (AI) narration module, voice-over settings to generate one or more audio outputs the voice-over settings comprising one or more of tone, pace, gender, and emotional inflection parameters based on the extracted educational themes and narrative arcs, the AI narration module implementing a machine learning model trained on a dataset of educational video narrations to optimize voice-over parameters for educational retention;

generate, by a generative artificial intelligence (AI) module, one or more visual outputs aligned with identified themes, utilizing generative AI algorithms to create one or more unique, context-specific visual outputs directly from the analyzed textual content generating visual content specifically provided to complement the educational narrative;

integrate, by a multimedia assembly engine, the customized narration and generated visual content into a unified educational video, wherein the engine synchronizes voice-over with the visual outputs based on a temporal mapping algorithm, ensuring coherence between auditory and visual learning cues;

adapt, by an adaptive user interface, the audio and visual outputs based on user inputs for theme emphasis, narration style, and visual preferences, the adapting using an AI recommendation system that suggests customization options based on one or more of user feedback and historical success rates of educational engagement metrics.

\* \* \* \* \*